United States Patent Office 3,097,103
Patented July 9, 1963

3,097,103
METHOD OF COATING A FLUORESCENT LAMP TUBE
Horace H. Homer, Arlington, and Fred R. Taubner, Danvers, Mass., assignors to Sylvania Electric Products Inc., a corporation of Delaware
No Drawing. Continuation of application Ser. No. 366,858, July 8, 1953. This application Aug. 12, 1959, Ser. No. 833,136
2 Claims. (Cl. 117—33.5)

The present invention relates to fluorescent lamps and the like, and particularly to the fluorescent coating used in such lamps and to methods of applying such coatings.

The coating applied to the lamp has a tendency to chip off in spots. Various methods of improving the adherence have been tried, including the use of colloidal silica gel, but they have all reduced the phosphor efficiency.

We have discovered that a highly-purified powdered amorphous silica of extremely small particle size, when used in a fluosecent lamp phosphor coating, will greatly improve the adhesion of the phosphor coating to the glass, without decreasing the luminous efficiency.

The silica used is composed of discrete, amorphous particles which go into suspension in water, as distinguished from silica that goes into a hydrated form in water, becoming silicic acid, or existing as a gel. The silica should be highly purified to avoid absorption of the exciting ultraviolet radiation used in the lamp. Amorphous silica can be obtained with a water content of less than 1%, and with the impurities of the completely dry silica being less than 1%. Such silica can be obtained in particle sizes of about 0.02 micron.

The amount of superfine high-purity silica powder used should be greater than 0.05% by weight of the phosphor and less than 2.0%. Amounts of 0.05% or less, do not improve the adherence, and amounts of 2.0% or more reduce the efficiency.

This is shown by the following tables, which give the results in lumens per watt (abbreviated L.P.W. in the tables) of tests on phosphor coatings in the standard 40-watt fluorescent lamps, which are long glass tubes coated on the inside surface with phosphor, and having oxide-coated electrodes at each end with a filling of mercury vapor and argon gas.

*Test No. 1*

| Lamps | L.P.W. 100 hours | Remarks |
|---|---|---|
| Control | 63.3 | Chipped badly |
| 0.05% $SiO_2$ | 64.2 | Chipped badly |
| 0.5% $SiO_2$ | 64.0 | Very little chipping |

*Test No. 2*

| Lamps | L.P.W. 100 hours | Remarks |
|---|---|---|
| Control | 64.7 | Chipped badly |
| 0.1% $SiO_2$ | 64.8 | Less Chipping |
| 0.5% $SiO_2$ | 64.2 | Very little chipping |
| 1.0% $SiO_2$ | 64.6 | No chipping |
| 2.0% $SiO_2$ | 61.7 | No chipping |

The controls were standard 40 watt lamps with no silica added to the phosphor coating; the other lamps were standard in all other respects but had superfine high-purity silica added to their phosphor coating in the amounts specified.

The coating suspension for the standard 40 watt lamp was made of the following ingredients:

300 grams phosphor powder, 4 cc. Armeen CD, which is a mixture of primary amines in the following proportions: octyl 8, decyl 9, dodecyl 47, tetradecyl 18, hexadecyl 8, octadecyl 5, octadecynyl 5.

255 cc. ethyl cellulose solution of approximately 12 seconds viscosity, containing the following ingredients in the following approximate proportions by weight: 200-second ethyl cellulose 2.9, dibutyl phthalate 4.4, xylol 91.4, butanol 1.3.

The suspension for the other lamps was made of the above-listed ingredients plus varying amounts of superfine high-purity silica powder. For the 0.05% lamps, 0.15 gm. of the silica was added to the above suspension, for 0.1%, 0.30 gm. was added, and for .5%, 1.0% and 2.0% respectively, 1.5 gms., 3.0 gms. and 6 grams were added.

In each case, the suspension was placed in a 1 quart ballmill with flint balls and rolled for 8 hours to insure proper dispersion of the powders in the suspension.

The suspension was then applied to the open glass to be used in the lamp in the usual manner, by being allowed to flow down the inside surface of the glass from the top thereof, as shown in U.S. Patent No. 2,412,954, granted December 24, 1946, to V. Zdancewicz. The tube was dried, then baked in a furnace in the usual manner, for about a minute at about 500° C. The tube was in the furnace for several minutes, but only about a minute in the hottest or 500° zone. The tube was then finished into a fluorescent lamp in the manner customary in the art.

The phosphor used in the particular tests cited was calcium halophosphate, activated by antimony and manganese, as described in the U.S. Patent 2,544,663 granted March 13, 1951, to D. F. Fortney and G. L. Moran. The addition of superfine high-purity silica is, however, useful with phosphors in general, for example manganese-activated zinc silicate, manganese and lead-activated calcium silicate.

This application is a continuation of our copending United States patent application Serial No. 366,858, filed July 8, 1953, and now abandoned.

What we claim is:
1. A method of coating a flourescent lamp tube, said method comprising coating the tube with a suspension containing between about 0.05% and about 2.0% of superfine high-purity powdered silica by weight of phosphor, said silica and phosphor being composed of separate particles, said silica having a particle size of about 0.02 microns and being of the type composed of discrete amorphous particles which go into suspension in water, as distinguished from the type which goes into a hydrated form in water, and baking the coated tube.
2. A fluorescent coating on a transparent base, said coating comprising powdered phosphor particles and between about 0.05% and 2.0% of separate superfine high purity amorphous silica particles of an average particle size of about 0.02 micron.

References Cited in the file of this patent
UNITED STATES PATENTS

| 2,278,742 | Scott et al. | Apr. 7, 1942 |
| 2,621,134 | Welch | Dec. 9, 1952 |
| 2,838,707 | Schwing et al. | June 10, 1958 |
| 2,841,505 | Schmidt | July 1, 1958 |

FOREIGN PATENTS

| 521,099 | Great Britain | May 13, 1940 |